United States Patent [19]

Mastalski et al.

[11] 4,066,368
[45] Jan. 3, 1978

[54] HELICAL ROD DEADEND HAVING SEGMENTED ROD RECEIVING CONNECTOR

[75] Inventors: Henry N. Mastalski; James P. Lucas; Edward Dziedzic; David P. Eppinger, all of Centralia, Mo.

[73] Assignee: A. B. Chance Company, Centralia, Mo.

[21] Appl. No.: 602,064

[22] Filed: Aug. 5, 1975

[51] Int. Cl.² .............................................. F16G 11/04
[52] U.S. Cl. .................................. 403/211; 24/115 M; 24/115 N; 24/122.6
[58] Field of Search ............ 24/115 N, 115 M, 136 L, 24/136 K, 122.6; 52/230; 403/211, 291

[56] References Cited

U.S. PATENT DOCUMENTS

| 2,341,922 | 2/1944 | King | 403/275 |
|---|---|---|---|
| 3,220,074 | 11/1965 | Ehmann | 24/115 M |
| 3,775,811 | 12/1973 | Smrekar | 24/115 N |
| 3,905,711 | 9/1975 | Rogers | 24/115 M |

FOREIGN PATENT DOCUMENTS

| 405,524 | 11/1924 | Germany | 24/115 M |
|---|---|---|---|
| 34,348 | 5/1911 | Sweden | 24/136 K |
| 341,186 | 11/1959 | Switzerland | 24/115 N |

*Primary Examiner*—Bernard A. Gelak

*Attorney, Agent, or Firm*—Schmidt, Johnson, Hovey & Williams

[57] ABSTRACT

An easily installable, high load capacity deadending apparatus for securing the end of lines such as guy cables and the like to anchoring structure is provided which includes a tapered wedge block in conjunction with a helically preformed line tie adapted to grip the line and preferably extend around and engage the remote end of the wedge block for securing the latter against substantial axial movement; a socket casting having a complementally tapered bore is applied over the wedge block and line tie thereround to complete the apparatus and permit connection thereof to an earth anchor or like device so that the socket and block are biased together in mutual gripping interengagement. In practice, as the line experiences increasing tension loads, the wedge block and socket are pulled into tight interengagement which in turn causes a tighter grip of the line and increases the overall holding power of the deadending apparatus. This operation has been found to unexpectedly enhance the holding power of the present deadending apparatus as compared with conventional units. In alternative forms the wedge block is provided with a continuous, peripheral line-receiving groove or a central bore defined by opposed block sections for receiving and holding a line adjacent the end thereof.

4 Claims, 9 Drawing Figures

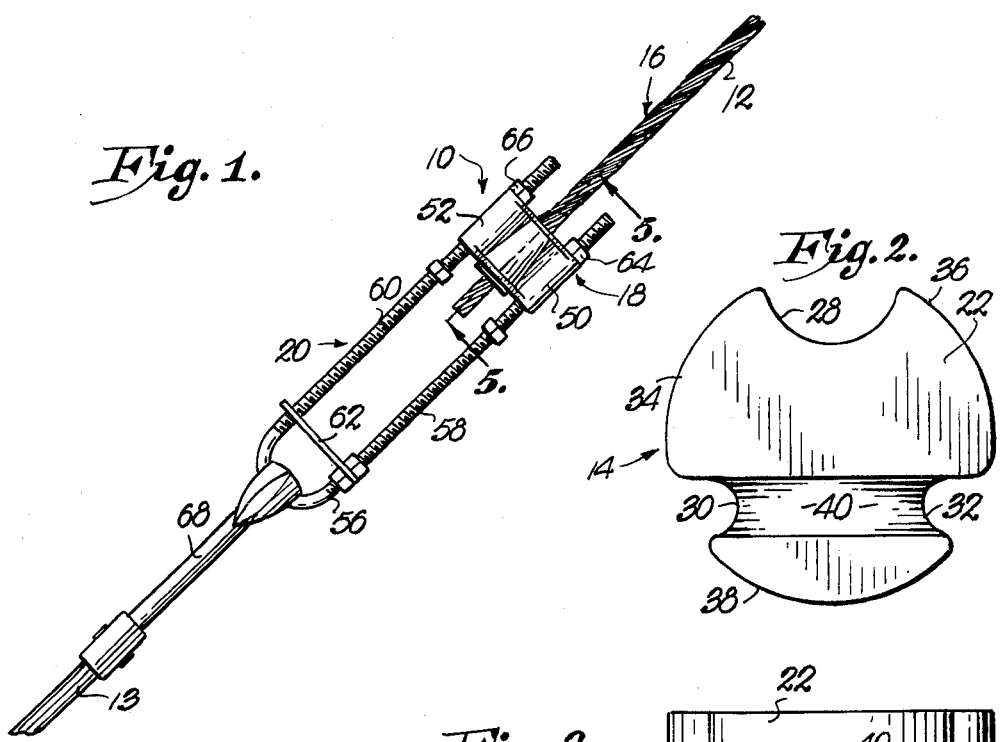
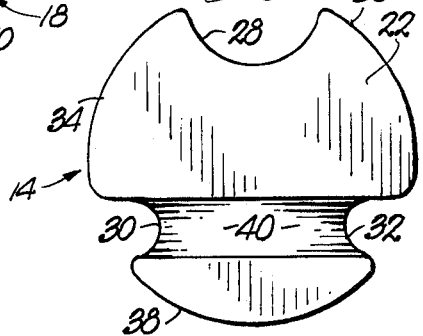
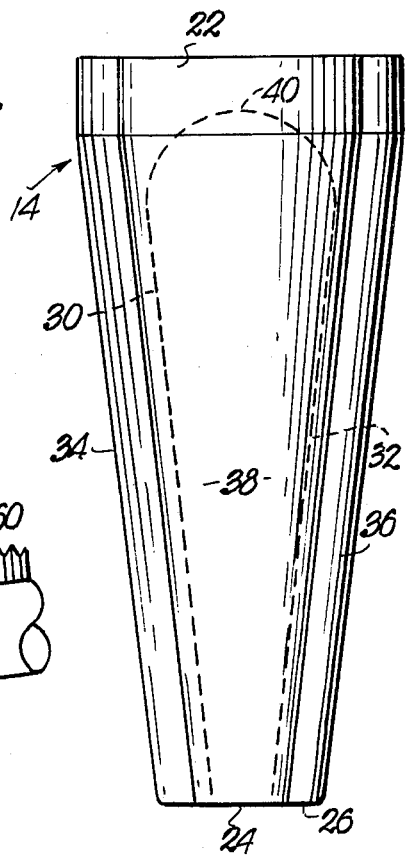
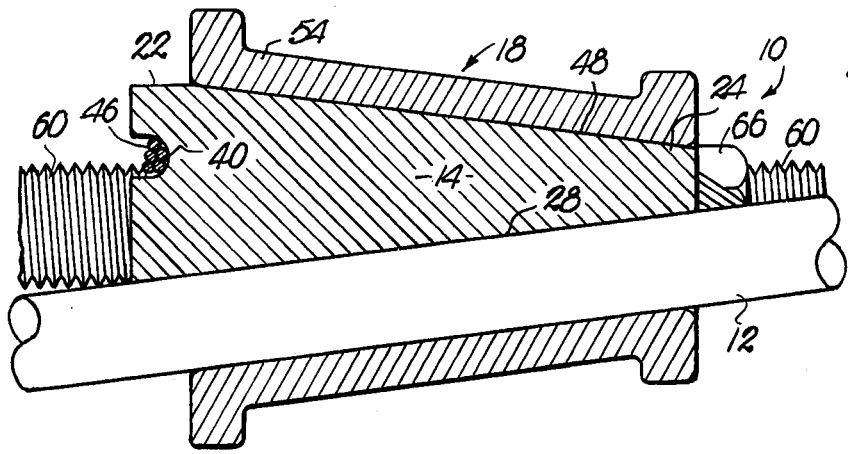
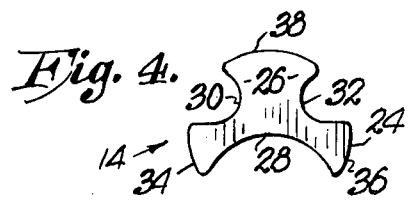

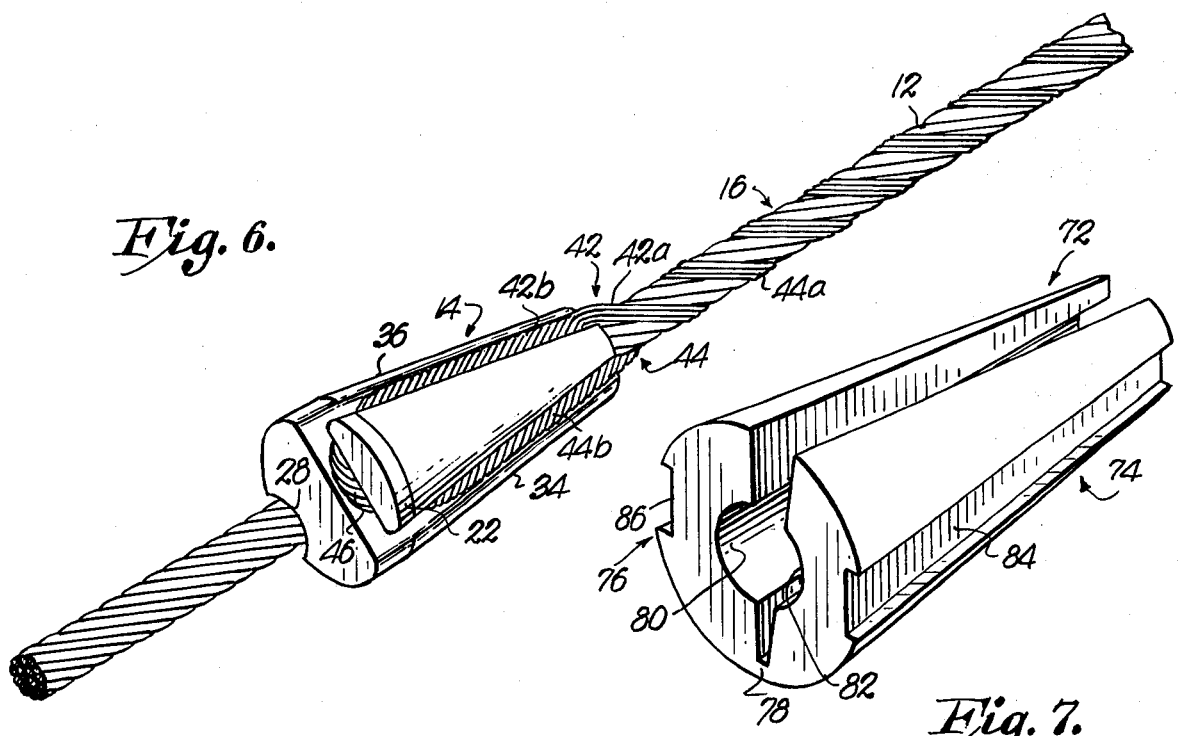
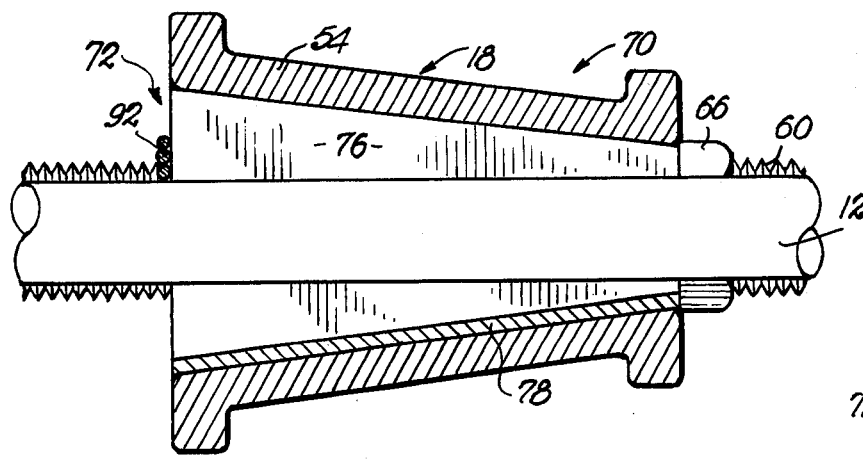
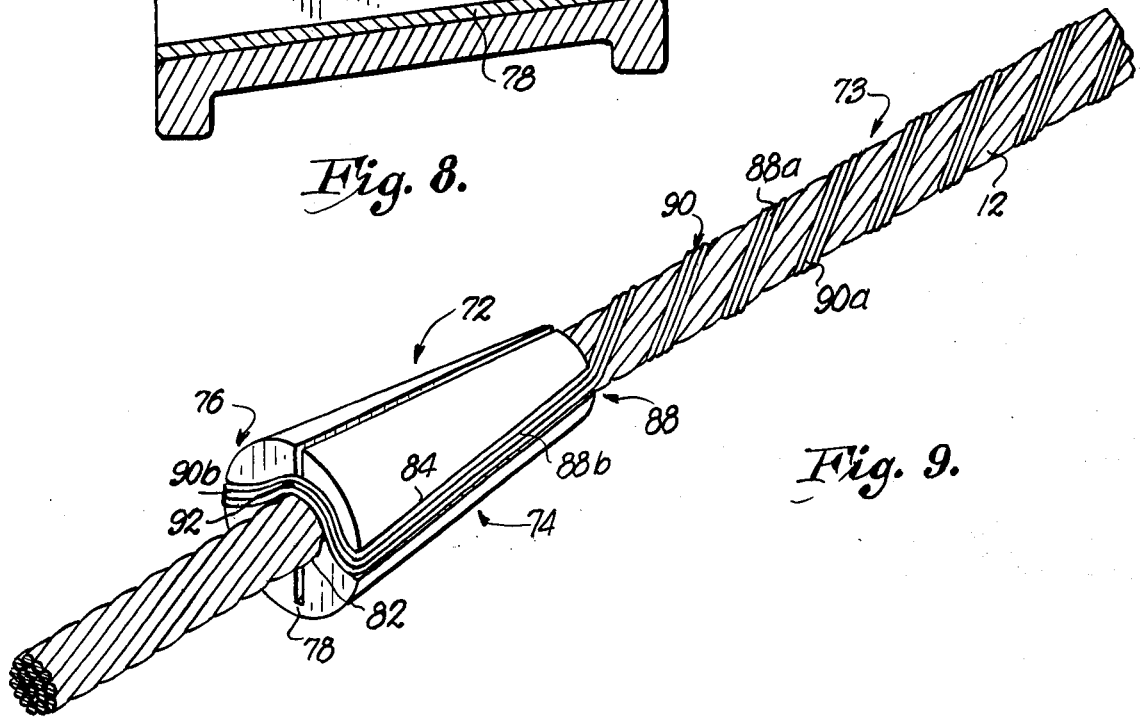

HELICAL ROD DEADEND HAVING SEGMENTED ROD RECEIVING CONNECTOR

This invention relates to apparatus for securing the end of an elongated, linear body such as a line or cable to anchoring structure therefor. More particularly, it is concerned with such deadending apparatus which is easily installable in the field and serves to more tightly grip the line during periods of increasing tension loads on the line so that the holding power of the present deadending apparatus is enhanced in such situations.

It is common practice today for electrical utilities to install prefabricated transmission and distribution line towers, as opposed to building such structures on-site. Such prefabricated towers are normally transported to the work area and erected using guy cables which are secured to earth anchors buried in the ground adjacent the tower site. As can be appreciated, it is critical that a secure connection be established between the ends of the guy wires and the earth anchors, especially in situations where the tower will be subjected to high wind load conditions or other untoward ambient weather conditions.

Devices for providing a connection between guy cables and buried earth anchors are known in the art as "deadends", and a variety of such units have been proposed in the past. See, for example, U.S. Pat. Nos. 3,561,071, 3,551,959 and 3,551,960. While several of the prior devices have attained a degree of acceptance in the art, a number of problems have remained in certain instances. For example, in some cases the cost of the deadends is prohibitively high or they are difficult to install in the field using unskilled personnel. Moreover, some prior deadends have not provided the degree of holding power necessary to maintain the integrity of guy systems which are subjected to abnormally high tension loads. Therefore, workers in the art have been searching for ways to increase the efficiency of deadend apparatus without a concomitant increase in the cost thereof or in the difficulty of installing the same.

It is therefore the most important object of the present invention to provide deadending apparatus for securing a line or cable to anchoring structure therefor which is characterized by an unexpectedly enhanced holding power under high tension load conditions notwithstanding the fact that the apparatus is of simplified construction, relatively low in cost, and is easily installable in the field by workmen needing only a minimum of training.

Another object of the invention is to provide deadening apparatus including a block having a line-receiving opening therein in conjunction with at least one line tie for gripping the line and securing the block against substantial movement axially of the line, and socket structure in surrounding relationship to the block for causing the latter to firmly grip the line; in preferred forms the block and socket are of complementally tapered configuration such that when the line is placed in tension the tapered wedge block and socket are pulled into tight mutual interengagement which in turn tightens the grip on the line and thus increases the holding power of the deadending apparatus.

A still further object of the invention is to provide deadending apparatus of the type described wherein the wedge block can alternately be provided with a peripheral line-receiving groove or a substantially coaxial line-receiving bore defined by opposed, spreadable block sections; in addition, a pair of spaced, peripheral, line tie-receiving grooves are provided which extend the full length of the block and permit wrapping of a line tie therearound for pulling the block into tight interengagement with the surrounding anchored socket.

In the drawings:

FIG. 1 is an elevational view of deadending apparatus in accordance with the invention shown operatively installed adjacent the end of a guy cable for securing the latter to an earth anchor;

FIG. 2 is a plan view of the wedge block used in conjunction with the dead ending apparatus illustrated in FIG. 1;

FIG. 3 is an elevational view of the wedge block depicted in FIG. 2;

FIG. 4 is a bottom view of the wedge block illustrated in FIGS. 2 and 3;

FIG. 5 is a vertical sectional view taken along line 5—5 of FIG. 1 and illustrating the preferred embodiment of the present invention;

FIG. 6 is a perspective view illustrating the preferred wedge block of the present invention operatively attached to a guy cable by means of a continuous line tie;

FIG. 7 is a perspective view of a wedge block employed in another embodiment of the present invention;

FIG. 8 is a vertical sectional view taken along line 5—5 of FIG. 1 illustrating another embodiment of the present invention and showing the same operatively installed on a guy cable; and FIG. 9 is a perspective view depicting the wedge block illustrated in FIG. 7 installed on a guy cable and secured thereto by means of a continuous line tie.

Deadending apparatus 10 is shown in its environment of use in FIG. 1 for securing a guy cable 12 to anchoring structure such as a buried earth anchor 13. Broadly, apparatus 10 includes block structure 14 applied to line 12, a continuous, helically preformed line tie 16, a socket 18 positioned in surrounding, gripping relationship to block 14, and means 20 for securing the apparatus 10 to earth anchor 13 or similar anchoring structure.

In more detail block 14 is an elongated, unitary metallic member having a short, generally cylindrical section 22 and an integral, uniformly tapered frustoconical section 24. Block 14 is irregular in cross section and includes a relatively large line-receiving opening in the form of an indentation or groove 28 in the periphery thereof along with a pair of smaller, equidistantly spaced line tie-receiving openings in the form of separate grooves 30 and 32. As seen in FIGS. 2-4, the grooves 28, 30 and 32 extend substantially the full length of block 14. The outer surface of block 14 between the grooves is defined by respective, elongated, transversely arcuate surfaces 34, 36 and 38. Finally, a generally transversely extending, arcuate groove 40 is provided in the larger end of block 14 for receiving a connective portion of a continuous line tie which is wrapped about the end of block 14 for holding the latter in place on line 12. The respective line tie-receiving grooves 30, 32 and 40 are thus in communication to provide a continuous loop groove, and are preferably dimensioned so that the line tie will seat within the grooves without extending beyond the adjacent outer surfaces of block 14.

Turning now to FIG. 6, it will be seen that guy cable 12 is received within line-receiving groove 28 of block 14. In this instance a continuous, multiple wire line tie 16 is provided for securing block 14 against substantial movement axially of cable 12. In particular, line tie 16 includes respective elongated segments 42 and 44 each having a helically preformed first portion 42a and 44a which are in gripping engagement with line 12. A closely twisted bight portion interconnects segments 42 and 44 and includes second portions 42b and 44b which are attached to the corresponding first portions and received within grooves 30 and 32. The line tie bight also includes a portion 46 which is received within groove 40 and operatively connects the respective portions 42b and 44b to block 14 for securing the latter against significant axial movement. Thus, it will be seen that tie 16 is an elongated, continuous element which is wrapped about cable 12 and has a bight thereof received within the communicating line tie-receiving grooves of block 14. Although not shown in detail in the drawings, it is to be understood that other line tie arrangements could also be used to good effect in the invention as long as at least one line tie segment is operatively connected to block 14 and cable 12 for securing the block against substantial movement axially of the line. For example, only a single line tie segment secured to the block could be employed, or separate line tie segments in conjunction with a two-pronged bail or the like which could be received within groove 40 and connected to the respective line tie segments.

Socket 18 is a unitary metallic member including an enlarged central section having a uniformly tapered bore 48 therethrough which is configured to complementally receive tapered section 24 of block 14, as best shown in FIG. 5. A pair of tubular sections 50 and 52 are respectively provided adjacent the enlarged central section 54 of socket 18. These sections 50 and 52 permit securement of socket 18, and thereby apparatus 20, to anchoring structure therefor, as will be explained.

Securement means 20 preferably includes a U-bolt 56 having a pair of spaced, threaded arms 58 and 60 which may be interconnected by means of reinforcing bar 62 and received within tubular sections 50 and 52 as shown in FIG. 1. A pair of load-bearing nuts 64 and 66 are applied over the threaded ends of arms 58 and 60 for holding socket 18 in place and drawing a tension load on the latter. Finally, a connection member 68 is provided for joining the closed end of U-bolt 56 and installed earth anchor 13.

Turning now to FIGS. 7-9, a second embodiment 70 of the present invention will be described. Embodiment 70 is likewise adapted for grippingly engaging cable 12 adjacent the end thereof and includes a block 72 and a line tie 73. Apparatus 70 also includes a socket 18 and securement means 20 which are identical in every respect with those described in connection with FIG. 1.

Block 72 differs from block 14 in that a substantially coaxial line-receiving bore is provided as opposed to a peripheral groove. In more detail, block 72 comprises an elongated, unitary, metallic, uniformly tapered generally frustoconical member which is defined by opposed wedge sections 74 and 76 which are interconnected along the common outer longitudinal edge 78 thereof. The opposed, adjacent faces of the sections 74 and 76 are configured to present elongated, generally semi-circular in cross section, centrally disposed, mutually concave bore-defining wall surfaces 80 and 82 which cooperatively present an elongated line-receiving bore extending the full length of block 72. As will be understood from a study of FIGS. 7-9, the respective wedge sections 74 and 76 are spreadable to a limited degree to permit line 12 to be seated within the central bore.

The outer surface of block 72 is generally circular in cross section but includes a channel-like line tie-receiving groove 84 and 86 in the periphery of each wedge section 74 and 76. Each groove 84 and 86 extends the full length of block 72 as best seen in FIGS. 7 and 9 and is preferably dimensioned to receive a portion of the flat bight of tie 73 so that the multiple wires of the latter do not project beyond the adjacent outer surfaces of the block.

Line tie 73 is similar in most respects to tie 16 and comprises a multiple wire, elongated element defined by respective segments 88 and 90 and an intermediate flat-bight section. Each segment 88 and 90 includes helically preformed first portion 88a and 90a, having a corresponding, substantially flat sections 88b or 90b connected thereto. A connecting portion 92 joins the respective portions 88b and 90b and engages the end of block 72 remote from the helically preformed portions 88a and 90a.

As best seen in FIG. 9, the helically preformed sections 88a and 90a of continuous tie 73 are applied to guy 12 in gripping engagement therewith, with the continuous loop bight defined by portions 88b, 90b and 92 extending along grooves 84 and 86 and the larger end of block 72 for biasing wedge sections 74 and 76 into gripping engagement with the centrally disposed guy cable and holding block 72 against substantial axial movement.

In installation operations with either of the above embodiments, socket 18 is first slipped onto cable 12 through the central socket bore and slid axially up the cable for permitting work adjacent the end thereof. The wedge block is then operatively placed adjacent the end of cable 12, preferably leaving a short stretch of line below the block. In the case of block 14, line 12 is simply positioned within groove 28, while with block 72 the wedge sections 74 and 76 thereof are slightly spread to permit line 12 to seat within the central bore therein. The next step involves applying the continuous line tie 16 or 73. This is preferably accomplished by looping the bight section thereof around the block so that the bight engages the block at the larger end thereof and is received within grooves 30 and 32 or 84 and 86. At this point the helically preformed portions of the line tie are applied around the cable above the block for grippingly engaging the cable and securing the block in place against substantial movement axially of the line.

The next step involves shifting the socket 18 downwardly until the tapered block is firmly seated within the socket bore. At this point connection member 68 is attached to the shaft of earth anchor 13 and U-bolt 56, and the respective arms 58 and 60 of the latter are inserted within the tubular sections 50 and 52 of socket 18. The final step involves drawing the load-bearing nuts 64 and 66 against the upper marginal edges of the tubular sections 50 and 52 for drawing the correct tension on guy cable 12. This last step may be accomplished by using a torque wrench for assuring that a correct and even load is imposed upon guy cable 12. The result of this installation procedure is to bias the block and socket sections into tight mutual interengagement so that the line 12 is adequately gripped. That is, the line tie serves to pull the block in one direction axially of the line, while the socket is pulled in the opposite direction by virtue of securement means 20 so that the socket and block are biased in opposition to each other. In the case of embodiment 10, the block and socket cooperatively grip the line, while with embodiment 70 the socket compresses the block around the centrally disposed cable. Finally, it will also be seen that in both embodiments the block and socket cooperatively present therebetween a pair of spaced line tie-receiving openings which extend the full length of the deadending apparatus.

As explained above, the present deadending apparatus provides unexpectedly enhanced holding power as compared with prior devices. This enhancement is believed to stem principally from the use of a biased-together block and socket arrangement which serves to increase the gripping action on the line during instances of high tension load on the latter. Thus, in the case of relatively tall transmission and distribution towers, when high wind loads are encountered which increase the tension load on the guy cables, the deadending apparatus hereof actually grips the guys more tightly to prevent failure thereof.

In order to demonstrate the above effects, a series of tests were undertaken. In the first such test (No. 1) a wedge block identical to that described in connection with embodiment 70 was applied about the end of a length of ⅜ inch, No. 19 extra high strength galvanized steel strand rated at 79,700 lbs. ultimate strength. The central bore of the wedge was coated with aluminum oxide grit composed of equal parts of 60, 90 and 120 mesh sizes. A conventional vinyl plastic adhesive was used to bond the grit to the central bore of the block. A mating socket was then slipped over the block with no particular care being taken to seat the block, and the apparatus was placed under a tension load. The wedge slipped on the cable at less than 100 lbs., indicating that a very poor deadend was established.

In another test (No. 2) identical apparatus was employed but the block was firmly seated within the socket by a series of sharp hammer blows. Under tension load, the block slipped at about 14,600 lbs., again a poor result.

A third series of tests (Nos. 3–5) were conducted to determine the effect of using only a line tie as described herein as a deadending device. In particular, three continuous straight-bight ties identical to tie 73 were respectively applied to ⅜ inch, No. 19 steel strands having a rated strength of 79,700 lbs. ultimate. The ties were composed of three 0.141 inch diameter hard drawn galvanized steel spring wire which had a maximum design strength of 3,489 lbs. per wire and a 36 inch gripping length. The inside surfaces of the helically formed legs were coated with aluminum oxide in the manner described in connection with test No. 1. A tension load was then drawn on the bight sections of the ties with the following results:

| Test No. | Failure Load | % of Rated Strength of Guy |
|---|---|---|
| 3 | 2,300 lbs. | 2.88 |
| 4 | 5,600 lbs. | 7.03 |
| 5 | 5,000 lbs. | 6.27 |

A study of the above results will confirm that the line tie alone did not provide an effective deadend.

A final test (No. 6) using the complete apparatus of the invention was also undertaken to demonstrate the holding power thereof. In this case the block, socket and flat-bight line tie were as described in embodiment 70. The block and line tie (same as tests Nos. 3–5) were applied using grit and adhesive, as in Test No. 1. No particular care was taken to seat the block within the wedge. During testing, the deadending apparatus was loaded in tension to 85,000 lbs. when one wire of the tie failed. 85,000 lbs. represents 106.6% of the rated strength of the guy strand.

A comparison of Tests 1–6 will confirm that the complete apparatus of the present invention serves to unexpectedly and synergistically provide an excellent deadend, as opposed to the respective components of the apparatus.

Having thus described the invention, what is claimed as new and desired to be secured by Letters Patent is:

1. Deadending apparatus for an elongated line or the like, including:
   an elongated, unitary, uniformly tapered block having structure defining three circumferentially spaced, peripheral grooves extending along the length of the block,
   one of said grooves being configured for receiving a segment of said line adjacent the end thereof with a portion of the line extending radially outwardly beyond the adjacent outermost surfaces of the block,
   the remaining two of said grooves being configured for receiving respective portions of a line tie;
   a line tie including a first section in gripping engagement with said line, and a second loop section free of said line, said loop section having respective elongated portions thereof received within corresponding line-tie receiving grooves of said block with a bight portion interconnecting said elongated portions and in engagement with the largest diameter end of said block,
   said line tie-receiving grooves being dimensioned such that said elongated portions are seated within the same without extending radially outwardly beyond the outer adjacent surfaces of said block; and
   a socket having structure defining a tapered bore therein for complementally receiving said block, the loop segment of said line tie positioned therearound, and the segment of said line received by said one groove,
   said socket and block cooperatively engaging said line, with the line tie portions seated within said remaining grooves being substantially free of pressing engagement between said socket and block.

2. Apparatus as set forth in claim 1 wherein said block is configured to present a groove in said largest diameter end thereof for receiving said bight portion.

3. Apparatus as set forth in claim 1 including structure defining a pair of apertures in said socket on opposite sides of said tapered bore for receiving the arms of a U-bolt, the latter having an intermediate section between said arms adapted for connection to anchoring means.

4. Deadending apparatus for an elongated line or the like including:
   an elongated, tapered block;
   a socket having structure defining a tapered bore therein for complementally receiving said block,
   said block and socket being cooperatively configured to present a line-receiving opening therebetween for receiving said line adjacent the end thereof in a manner such that said block and socket cooperatively engage the line,
   said block also being configured to present a pair of line tie-receiving openings along the length thereof;

a line tie including a first section in gripping engagement with said line, and a second loop section free of said line, said loop section having respective elongated portions thereof received within corresponding line tie-receiving openings with a bight portion interconnecting said elongated portions and in engagement with the largest diameter end of said block, said elongated portions being of a diameter to be received within said openings therefor and be substantially free of pressing engagement with said block and socket.

* * * * *